Dec. 6, 1966 J. K. KRATZ 3,290,534
ECCENTRICALLY MOUNTED BEAM POSITION ADJUSTING DEVICE
Filed March 15, 1965 2 Sheets-Sheet 1

INVENTOR.
JERROLD K. KRATZ
BY William H. Meagher
Attorney

Dec. 6, 1966  J. K. KRATZ  3,290,534
ECCENTRICALLY MOUNTED BEAM POSITION ADJUSTING DEVICE
Filed March 15, 1965  2 Sheets-Sheet 2

INVENTOR.
JERROLD K. KRATZ
BY
William H. Meagher
Attorney

United States Patent Office 3,290,534
Patented Dec. 6, 1966

3,290,534
ECCENTRICALLY MOUNTED BEAM POSITION ADJUSTING DEVICE
Jerrold K. Kratz, Indianapolis, Ind., assignor to Radio Corporation of America, a corporation of Delaware
Filed Mar. 15, 1965, Ser. No. 439,600
7 Claims. (Cl. 313—77)

This invention relates generally to beam position adjusting devices, and, particularly, to devices suitable for providing so-called lateral correction effects to aid in the converging of the multiple beams of a multi-gun color image reproducing device.

A widely used form of color image reproducing device is the tri-gun, shadow-mask color kinescope. In operation of such a kinescope, it is intended that each of the beams produced by the three guns of the tube should selectively excite a particular set of phosphor dots luminescing in a particular primary color. To ensure that a particular beam selectively excites its assigned phosphor dots, the beam must approach the apertures of the shadow-mask that precedes the phosphor screen with the proper angle of approach. It is also important that the plurality of beams converge at the target to effect light production at coincident target regions. For such convergence purposes, there is conventionally associated with the tri-gun color kinescope a set of beam convergence magnets for effecting adjustment of the respective beam positions prior to their deflection.

Such beam convergence structures are usually called upon for both static and dynamic adjustments. The so-called static adjustments are made to ensure the establishment of the proper beam convergence at the center of the phosphor screen; the dynamic adjustments then serve to ensure maintenance of the proper convergence for the bundle of beams throughout their deflection from the center in the course of the raster scanning process.

To achieve the center-of-the-screen static beam convergence, it has proved convenient to provide individual adjustment magnets for each beam, each magnet being subject to manual adjustment to vary the position of the associated beam in a radial direction with respect to the kinescope axis. The guns of the conventional tri-gun, shadow-mask color kinescope are disposed in a triangular configuration within the kinescope neck; the triangle is conventionally oriented in such manner that the blue phosphor exciting gun is positioned along a radius which extends from the axis vertically (in terms of the normal display position of the phosphor screen). It will be appreciated that with such a positioning of the blue gun, adjustment of the blue beam position along a radius from the tube axis corresponds to adjustment of the blue beam in a vertical direction.

In order to provide ability to correct for all possible misconvergence errors, it is necessary to supplement the three individual beam adjustments in respective radial directions with a fourth adjustment parameter. It can readily be shown that if individual beam adjustments along respective radii are supplemented by beam adjustment of just one of the three beams in a direction at right angles to the radial direction of adjustment for that beam, all patterns of misconvergence at the center of the screen are amenable to correction.

It is convenient, and has become customary, to associate the required fourth beam position adjustment parameter with the blue beam; i.e. to provide an adjustment of the blue beam position in a lateral or horizontal direction. In order for the four parameters of beam adjustment to be independent, the lateral adjustment of the blue beam generally should not affect the positioning of the remaining beams; this rule is subject, however, to one exception: movement of the other beams in the opposite lateral direction is readily tolerable and, indeed desirable, since this accentuates the desired adjustment of the relative beam positions when controlling this fourth parameter.

The present invention is directed to novel and improved structure suitable for providing the aforesaid blue beam position adjustment in a lateral direction, together with concomitant opposite-direction lateral adjustment of the red and green beam positions. In accordance with the invention, a permanent magnet arrangement is provided which achieves confinement of the beam position adjustments to lateral movements through "offsetting" of the magnetic means primarily influencing the red and green beam positions.

In accordance with a particular embodiment of the present invention the aforesaid offsetting technique is employed in conjunction with the use of a pair of six-pole magnet rings.

In a copending application of R. H. Hughes, Serial No. 439,599, entitled, "Magnetic Beam Adjusting Arrangements," and filed concurrently herewith, a beam controlling device is disclosed employing magnet rings of a six-pole configuration; north and south poles alternate about the periphery of each magnet ring at 60° intervals. As discussed in detail in said Hughes application, use of a pair of such rings in juxtaposition, rotatably mounted about the neck of a color kinescope, provides a convenient facility for effecting a desired beam position correction; in some of the embodiments disclosed in the Hughes application, the form of correction obtained is tangential for all beams (providing a "twist" effect), while in other Hughes' embodiments the correction is of the previously discussed lateral type. By equal and opposite rotation of the juxtaposed rings through a 60° arc, correction may be adjusted through a range extending from maximum correction in one direction through a zero correction position to maximum correction in the opposite direction.

In a six-pole magnetic ring arrangement embodying the principles of the present invention, the rings are eccentrically positioned relative to the outer surface of the color kinescope neck, the eccentricity being so oriented as to displace the lateral center line of the rings from the tube neck's lateral center line toward the red and green beam positions. The degree of eccentricity is chosen such that the lines of magnetic flux traversing the red and green beam positions are vertically directed; i.e., such that the fields at these beam positions are substantially free of horizontal components. As a consequence, equal and opposite rotation of the juxtaposed rings provides a lateral adjustment of the blue beam position together with opposite-direction lateral adjustments of the red and green beams without introducing any significant vertical separation of the beams.

Thus, a primary object of the present invention is to provide novel and improved position adjusting devices.

A particular object of the present invention is to provide a beam position adjusting device suitable for providing lateral movements of the blue beam of a color kinescope together with opposing lateral adjustments of the kinescope's red and green beams without introducing vertical separation of the beams.

Other objects and advantages of the present invention will be readily recognized by those skilled in the art upon a reading of the following detailed description and an inspection of the accompanying drawings in which.

Figure 1:
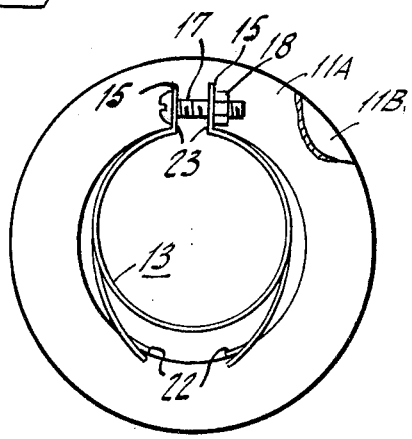
FIGURE 1 illustrates, in plan view, a beam position adjusting device in accordance with an embodiment of the present invention.
Figure 2:
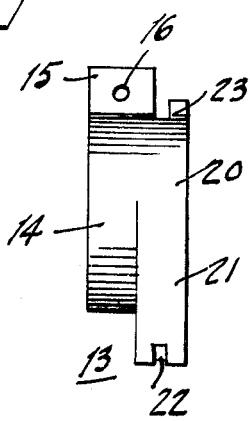
FIGURES 2 and 3 illustrate, in respective side and plan views, a mounting element of the device of FIGURE 1.
Figure 3:
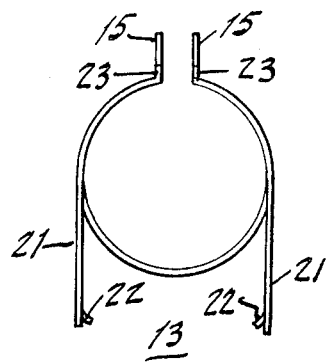

The beam position adjusting device of FIGURE 1 includes a pair of magnet rings 11A and 11B (illustratively, of isotropic magnetizable material such as 1% carbon steel) mounted on a support generally designated 13. The support 13, as shown more clearly in FIGURES 2 and 3, includes a body portion 14 of a split cylindrical configuration. Outturned tabs 15 are provided at the opposing edges of the cylinder split; the tabs 15 are pierced by aligned apertures 16 through which a clamping screw 17 extends. Tightening of nut 18 on the clamping screw 17 enable securing of the main body portion 14 in a desired position encircling the neck of a color kinescope.

An extension of the main body portion 14, generally designated 20, only partially conforms to the split-cylinder configuration of the main body portion. The lower extremities of the extension 20 comprise two flexible free-ended projection 21. Each projection 21 is centrally slitted at its free end in such a way as to form an inwardly turned tab 22.

At its upward extremity the extension portion 20 is provided with outwardly turned tabs 23, aligned with the tabs 15 of the main body portion 14, but longitudinally spaced therefrom. The notch-like space provided between the aligned tabs 15 and 23 is in circumferential alignment with the channels formed in the projections 21 by the inturning of tabs 22.

In assembly of the device of FIGURE 1, the rings 11A and 11B are mounted in juxtaposition within the notch-like space between aligned tabs 15 and 23 and within the channels formed by the inturned tabs 22. Such mounting of the rings constrains the flexible projections 21 to assume the inwardly curved positions shown in FIGURE 1.

The rings 11A and 11B have an inner diameter which significantly exceeds the outer diameter of the main body portion 14 when clamped in a neck-encircling position. As illustrated in FIGURE 1, assembly of the rings on the mount disposes the rings eccentrically with respect to the neck-encircling body portion 14, and, hence, eccentrically with respect to the tube neck. The spacing between aligned tabs 15 and 23 is dimensioned, as are the channels formed by the inturned tabs 22, to permit rotational adjustment of the positions of the mounted rings 11A and 11B.

Figure 4:
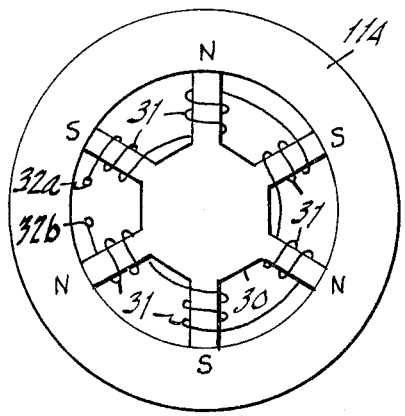
FIGURE 4 illustrates structure suitable for effecting six-pole magnetization of rings for use in the device of FIGURE 1.

Each of the rings 11A and 11B of the device of FIGURE 1 is provided with a six-pole magnetization pattern, such as illustrated by the pole designations on the ring 11A shown in FIGURE 4. An example of structure which may be employed to achieve such six-pole magnetization is also shown in FIGURE 4. The magnetizer comprises a spoked core 30. The core 30 is hexagonally shaped, with six spoke-like projections from each hexagon corner. A magnetizing winding 31 is wound about each of the spokes, with the winding direction alternating on successive spokes about the core periphery. The windings are connected in series between energizing terminals 32a and 32b. A suitable energy source (such as a capacity discharge device) is connected between terminals 32a and 32b to cause a high value of current to traverse the magnetizing windings, to produce the desired six pole configuration in a magnet ring positioned about the outer periphery of the core spokes. Illustratively, the spoked, hexagonal core 30 may be of laminated form, built up from lamina of suitable magnetizable material (such as magnetic iron). It may be preferable to simultaneously magnetize both rings of the pair to be employed in a FIGURE 1 device by using the above-described technique with the two rings adjacently mounted about the outer periphery of the core spokes.

Figure 5A:
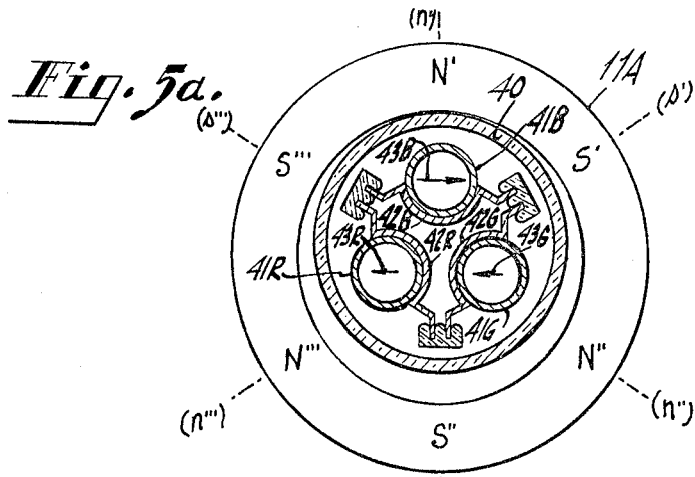
FIGURES 5a, 5b and 5c illustrate the effects of rotational adjustments of the rings of the FIGURE 1 device on the beams of a color kinescope.
Figure 5B:
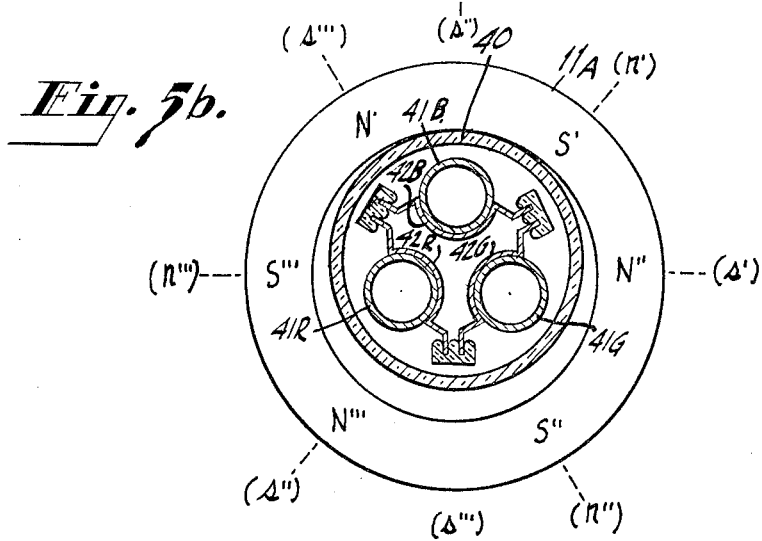
Figure 5C:
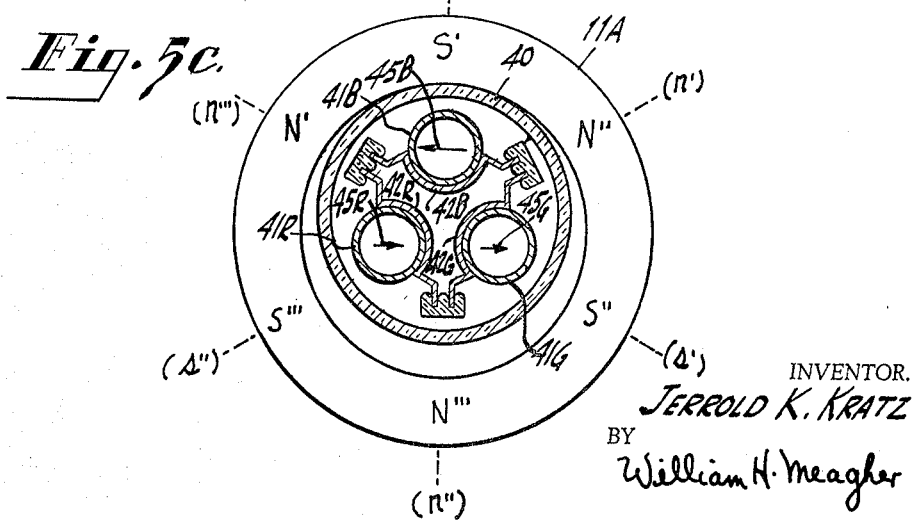

FIGURES 5a, 5b and 5c illustrate three different positions of rotational adjustment of the rings 11A and 11B of the device of FIGURE 1, and the resultant motions of the respective beams within the color kinescope neck 40 encircled by the device. The locations of the successive poles of ring 11A are represented in these figures by upper case designations: $N'$, $S'$, $N''$, $S''$, $N'''$ and $S'''$; the locations of the poles of the adjacent ring 11B (hidden in the plan views) are indicated by lower case designations: $(n')$, $(s')$, $(n'')$, $(s'')$, $(n''')$ and $(s''')$. While the rings are shown in the eccentric relation to the tube neck that is established for them by the mounting element 14 of the device, a showing of the element 14 has been omitted from these figures to simplify the drawing.

In FIGURE 5a, the rotational positions of the rings are such as to place the north pole $N'$ of ring 11A and the north pole $(n')$ of ring 11B adjacent to the cylindrical blue gun electrode 41B, and in alignment with the center of electrode 41B along a vertical radius of tube neck 40. The lines of flux flowing (per convention) from pole $N'$ to the adjacent south poles $S'$ and $S'''$ pass through the center of electrode 41B in a vertically downward direction, producing a lateral deflection of the blue beam as indicated by arrows 43B.

The field influencing the green beam within the green gun electrode 41G is primarily determined by the flux lines flowing from pole $N''$ to pole $S'$ of ring 11A, and the similarly directed flux-lines between the comparably located poles $(n'')$ and $(s')$ of ring 11B. By virtue of the eccentric positioning of the rings relative to the tube neck, resulting in an appropriate shift of the lateral center line of the rings below the lateral center line of the tube neck, the poles $N''$ and $S'$ (as well as the coincidentally located poles of ring 11B) are disposed in substantial vertical symmetry with respect to electrode 41G, producing upwardly directed vertical flux lines in the center of electrode 41G. The resultant shift of the position of the green beam (as indicated by arrows 43G) is lateral, but in a direction opposite to the blue beam shift. Due to the relatively longer air gap distance associated with the flux lines influencing the green beam, the magnitude of the lateral shift of the green beam is less than that of the blue beam shift.

The red beam within the red gun electrode 41R is subjected to a lateral shift of position comparable in magnitude and direction to that of the green beam through the agency of the $N'''$–$S'''$ field of ring 11A and the coinciding $(n''')$–$(s''')$ field of ring 11B.

The relative ring positions represented in FIGURE 5a provide the maximum lateral correction effect of a first polarity obtainable from the FIGURE 1 device. In FIGURE 5b, the rings 11A and 11B have been rotated from their FIGURE 5a positions to relative positions providing a minimum correction effect, i.e. substantially zero shift of beam positions. The ring positions of FIGURE 5b may be obtained by giving ring 11A a 30° counter-clockwise rotation from its FIGURE 5a position, while concomitantly rotating ring 11B 30° in a clockwise direction. The result is to align each pole of ring 11A with a mutually opposing pole of ring 11B; i.e., $N'$ aligned with $(s''')$, $S'$ aligned with $(n')$ etc. The fields of ring 11A are in direct opposition to the fields of adjacent ring 11B, and the fields accordingly mutually cancel, thereby producing substantially no beam shifting effects.

Any equal-and-opposite rotations of rings 11A and 11B from their FIGURE 5a positions, short of the full 30° movement producing the FIGURE 5b alignment, will produce a lessening of the magnitude of beam shifts from the FIGURE 5a maximum, but the beam shifts will remain lateral ones in the respective directions indicated by arrows 43B, 43G and 43R.

FIGURE 5c is illustrative of relative ring positions providing a maximum lateral correction effect of a polarity opposite to that obtained with the FIGURE 5a orientation. The ring positions of FIGURE 5c may be obtained by giving ring 11A a further 30° counter-clockwise rotation from its FIGURE 5b position, while concomitantly rotating ring 11B an additional 30° in a clockwise direction.

In the FIGURE 5c orientation, the poles of ring 11A are in alignment with like poles of ring 11B; however, each paired set of south poles occupies a location corresponding to the location of a paired set of north poles in the FIGURE 5a orientation, and vice versa. Thus, for example, south poles S' of ring 11A and south pole (s''') of ring 11B now occupy the position adjacent to the blue gun electrode 41B in alignment with the center of electrode 41B along a vertical radius of tube neck 40 (i.e., the position occupied by north poles N' and (n') in FIGURE 5a). As a consequence of such pole location exchanges, the effects on the respective beams are directly opposite to those obtained with the FIGURE 5a orientation, as indicated in FIGURE 5c by the respective arrows 45B, 45G and 45R.

For equal-and-opposite rotations of rings 11a and 11b from their FIGURE 5b positions toward, but short of, the full 30° movement productive of the FIGURE 5c alignment, lateral correction effects are obtained in the respective directions indicated by arrows 45B, 45G and 45R, but of a magnitude less than maximum.

From the foregoing description, it will be appreciated that the device of FIGURE 1 provides a facility for introducing a lateral beam correction ranging from a maximum shift of one polarity through zero to a maximum shift of the opposite polarity, a continuous adjustment through the full range being achievable through equal-and-opposite rotations of the rings 11A and 11B through respective arcuate distances of 60°. The correcting action is obtained in a manner substantially precluding introduction of any undesired vertical separation of the beams. While the primary shift is achieved with respect to the blue beam, the desired beam alignment is aided by an accompanying, closing shift of the red and green beams.

Illustratively, FIGURES 5a, 5b and 5c represent a longitudinal positioning of the FIGURE 1 device on the tube neck such as to encircle a neck region occupied by the so-called focusing electrodes (i.e., the G3 electrodes) of the respective kinescope guns. These electrodes (designated 41B, 41G and 41R in the drawing) are shown in association with supporting straps 42B, 42G and 42R in the region of encirclement. In certain kinescope designs, these straps are made of a soft magnetic material, whereby they may serve as internal pole pieces, aiding in the direction and isolation of the respective lateral correcting fields. In the event of use of the present invention in connection with kinescopes of such design, it should be recognized that these pole pieces will play a part in the shaping of the respective correcting fields. Thus, the precise degree of eccentricity assigned to the correcting device rings in order to achieve freedom from horizontal field components may differ in such a case from that which will be appropriate where no such internal pole pieces are provided.

It has been found that the presence of such internal pole pieces is not readily tolerated where the color kinescope is of a narrow neck, wide deflection angle type, for a variety of reasons not necessary to detail here. In such a case, there will be no internal magnetic structure affecting the shaping of the correcting fields; rather, the field shape will be essentially only affected by the relative pole locations. In either event, whether internal pole pieces are employed or not, the present invention may be utilized to provide an adjustable lateral correction effect substantially free of vertical beam separation introduction.

In a particular example of use of the principles of the present invention in conjunction with a wide angle color kinescope (RCA developmental type No. C74420) providing no internal magnetic structure for direction of the lateral correcting fields, the longitudinal location assigned to the correcting device placed it in a neck region encircling segments of the focusing electrodes of the respective guns unencumbered by supporting straps. The degree of ring eccentricity found to be appropriate placed the lateral center line of the rings in substantial coincidence with the lateral center line of the red and green gun electrodes.

Attention is directed to the copending application of Joseph Le Roy Werst, Serial Number 439,602, entitled, "Beam Controlling Device," and filed concurrently herewith, for a description of correcting device configurations wherein means are provided for automatically ensuring the achievement of equal-and-opposite ring rotations in practicing the principles of the present invention. Such configurations provided convenient device operation in the above-mentioned example of use with the C74420 kinescope.

What is claimed is:
1. In combination with a multibeam color kinescope having a cylindrical neck enclosing a plurality of electron guns, a beam position adjusting device, comprising the combination of:
    a mount having a generally cylindrically walled aperture through which said cylindrical neck extends;
    magnetic field producing means for producing respective beam position adjusting magnetic fields within said plurality of electron guns, the field produced within one of said guns causing motion of the electron beam of said gun in a direction opposite to the direction of motion of the electron beams of the remaining guns caused by the fields produced within said remaining guns;
    said mount including means for supporting said magnetic field producing means for rotation about said cylindrical neck on a circular path eccentrically disposed relative to said cylindrical neck.

2. In combination with a multibeam color kinescope having a cylindrical neck enclosing a plurality of electron guns, a beam position adjusting device, comprising the combination of:
    a mount having a generally cylindrically walled aperture through which said cylindrical neck extends;
    multipole magnetic field producing means for producing respective lateral beam position adjusting magnetic fields within said plurality of electron guns, said multipole magnetic field producing means being supported on said mount for rotation about said cylindrical neck on a circular path eccentrically disposed relative to said cylindrical neck;
    the direction of eccentricity of said path disposal being such that poles of said multipole magnetic field producing means which are primarily determinative of the field produced within a first one of said plurality of electron guns are located in relatively close proximity to said one gun while poles of said magnetic field producing means which are primarily determinative of the respective fields produced within said remaining guns are more remotely spaced from said remaining guns;
    and the degree of said eccentricity of path disposal being selected such that the magnetic fields produced within said remaining guns are substantially free of lateral components.

3. A lateral correcting device for a multibeam color kinescope, comprising the combination of:
    a pair of ring magnets, each provided with a pattern of six alternating poles located symmetrically along the ring circumference;
    neck mount structure having a cylindrical aperture dimensioned to receive a kinescope neck;

and means for retaining said pair of ring magnets on said neck mount such as to permit adjustable rotation of said rings along a circular path eccentrically disposed with respect to said neck receiving aperture.

4. A lateral correcting device for a multibeam color kinescope, comprising the combination of:
   a pair of ring magnets, each provided with a pattern of six alternating poles located symmetrically along the ring circumference;
   and neck mount structure, having a cylindrical aperture dimensioned to receive a kinescope neck, and including means for receiving said pair of ring magnets in rotatably adjustable positions eccentrically disposed with respect to said neck receiving aperture.

5. In combination with a multibeam color kinescope having a cylindrical neck enclosing a plurality of electron guns, one of said guns being centered on a vertically directed radius of said cylindrical neck; a lateral beam position adjusting device, comprising the combination of:
   a mount having a generally cylindrically walled aperture through which said cylindrical neck extends;
   a pair of six-pole ring magnets for producing respective lateral beam position adjusting magnetic fields within said plurality of electron guns, said ring magnets being supported in adjacent positions on said mount for adjustable rotation about said cylindrical neck on respective circular paths eccentrically disposed relative to said cylindrical neck;
   the direction of eccentricity of said path disposal being such that poles of said ring magnets which are primarily determinative of the field produced within said one gun are located in relatively close proximity to said one gun while poles of said ring magnets which are primarily determinative of the respective fields produced within the remaining electron guns of said plurality are more remotely spaced from said remaining guns;
   and the degree of said eccentricity of path disposal being selected such that the magnetic fields produced within said remaining guns are substantially free of lateral components.

6. In combination with a multibeam color kinescope having a cylindrical neck enclosing a plurality of electron guns, one of said guns being centered on a vertically directed radius of said cylindrical neck; a lateral beam position adjusting device, comprising the combination of:
   a mount havng a generally cylindrically walled aperture through which said cylindrical neck extends;
   a pair of six-pole ring magnets for producing respective lateral beam position adjusting magnetic fields within said plurality of electron guns;
   said mount including means for retaining said ring magnets in adjacent, adjustably rotatable positions eccentrically disposed relative to said cylindrical neck, the direction of eccentricity of said disposal being such that the lateral center lines of said ring magnets are shifted relative to the lateral center line of said cylindrical neck in a vertical direction away from said one gun.

7. In combination with a color kinescope having a cylindrical neck enclosing a plurality of electron beams, an adjustable beam position adjusting device, comprising the combination of:
   a mount having a generally cylindrically walled aperture through which said cylindrical neck extends;
   magnetic field producing means for producing respective beam position adjusting magnetic fields within said neck, one of the respective beam position adjusting fields produced within said neck causing motion of one of said plurality of electron beams in a direction opposite to the direction of motion of the remaining ones of said plurality of electron beams caused by the other beam position adjusting fields produced within said neck;
   said mount including means for supporting said magnetic field producing means for adjustable rotation about said cylindrical neck on a circular path eccentrically disposed relative to said cylindrical neck.

No references cited.

JAMES W. LAWRENCE, *Primary Examiner.*

R. SEGAL, *Assistant Examiner.*